Patented Nov. 16, 1937

2,099,158

UNITED STATES PATENT OFFICE 2,099,158

PROCESS OF PREPARING GLUCOSIDES HAVING AN ACTION ON THE HEART OBTAINED FROM OLEANDER LEAVES

Max Bockmühl and Gustav Ehrhart, Frankfort-on-the-Main, Germany, assignors to Winthrop Chemical Company, Inc., New York, N. Y., a corporation of New York No Drawing. Application June 27, 1936, Serial No. 87,802. In Germany July 12, 1935

4 Claims. (Cl. 87—28)

The present invention relates to a process of preparing glucosides having an action on the heart obtained from oleander leaves.

Processes for the production of producing from oleander leaves glucosides having an action on the heart have often been described. The general procedure is as follows: The aqueous or aqueous-alcoholic extracts required for obtaining the substances having an action on the heart are purified with lead acetate and the extracts thus pretreated are further treated to obtain glucosides in a solid form. The yields greatly vary and in the most favorable case amount to 0.15 per cent of the leaves used.

Now we have found that substances having an action on the heart may be obtained from oleander leaves in a yield of about 0.5 per cent by extracting with a suitable solvent the aqueous or aqueous-alcoholic extracts obtained in known manner from the dried or fresh leaves; suitable solvents are especially chlorinated aliphatic hydrocarbons, for instance, chloroform, carbon tetrachloride or methylene chloride. From the extract in the suitable solvent the effective substances are precipitated by addition of a suitable organic liquid, particularly saturated hydrocarbons, for instance benzine, petroleum ether, cyclohexane, methylcyclohexane, octane, nonane, decane, decahydronaphthalene. After this separation, the effective substances may again be dissolved and reprecipitated; for instance, the crude product may be dissolved in benzene and separated in a purified form by the addition of one of the above named organic liquids, such as cyclohexane or benzine.

The substance obtained by the invention is new, very sparingly soluble in water, but soluble in diethyl ether.

By the term "aqueous extracts of oleander leaves" appearing in the claims, aqueous-alcoholic extracts are likewise to be understood.

The following example serves to illustrate the invention, but it is not intended to limit it thereto:

1.3 kilos of finely ground oleander leaves are stirred for 5 to 6 hours with about 15 liters of water, the whole is then filtered and the clear dark filtrate is shaken several times with about 500 cc. of chloroform. All the chloroform extracts are dried with sodium sulfate and concentrated to a small volume. The concentrated extract is mixed with petroleum ether, until there is no longer any precipitate. The resin which has been separated is then dissolved in benzene, and the solution is filtered clear and poured into cyclohexane, whereupon a yellowish-white powder separates. The yield amounts to 6.8 grams.

With the same or a similar result the dried chloroform solution may be evaporated, finally under reduced pressure and the residue re-precipitated from a solution in a mixture of benzene and cyclohexane.

We claim:

1. The process which comprises extracting an aqueous extract of oleander leaves with a chlorinated aliphatic hydrocarbon, and precipitating the glucosides having an action on the heart dissolved therein by means of a liquid saturated hydrocarbon.

2. The process which comprises extracting an aqueous extract of oleander leaves with a chlorinated aliphatic hydrocarbon, precipitating the glucosides having an action on the heart dissolved therein by means of a liquid saturated hydrocarbon, and again dissolving and precipitating the glucosides.

3. The process which comprises extracting an aqueous extract of oleander leaves with a chlorinated aliphatic hydrocarbon, precipitating the glucosides having an action on the heart dissolved therein by means of a liquid saturated hydrocarbon, dissolving the glucosides in benzene and again precipitating them.

4. The process which comprises extracting an aqueous extract of oleander leaves with chloroform, concentrating the chloroform-extract, precipitating the glucosides by adding petroleum ether, dissolving the precipitate in benzene and again precipitating it by adding cyclohexane to the solution.

MAX BOCKMÜHL.
GUSTAV EHRHART.